Jan. 23, 1968 W. S. MILLER 3,364,755
MECHANICAL REACTION SMOOTHER
Filed Oct. 23, 1965
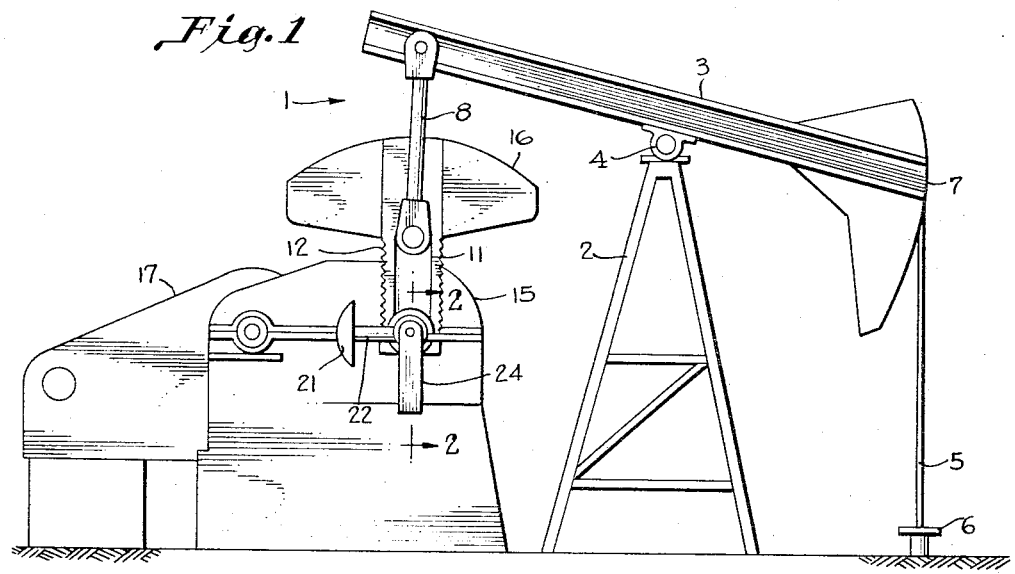
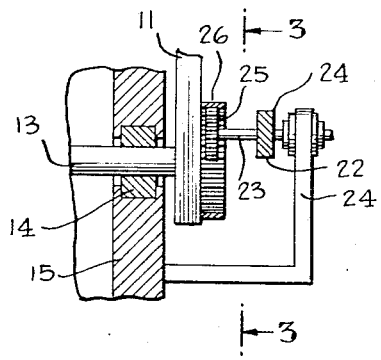
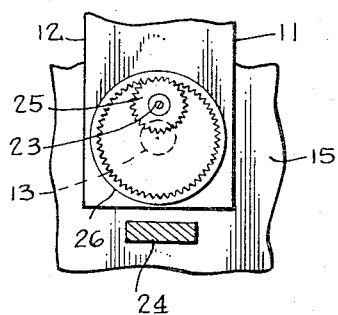
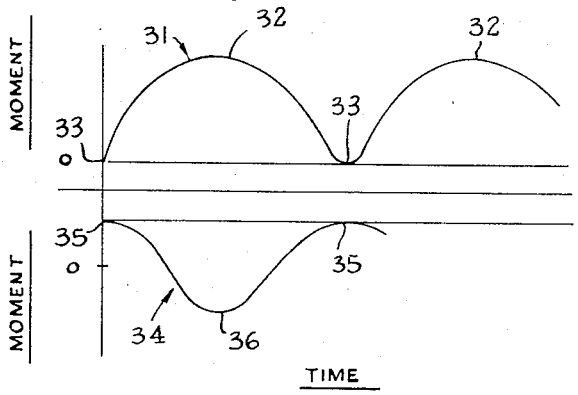
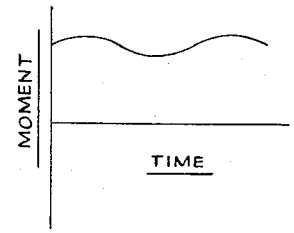
INVENTOR
WENDELL S. MILLER United States Patent Office 3,364,755
Patented Jan. 23, 1968

3,364,755
MECHANICAL REACTION SMOOTHER
Wendell S. Miller, 1341 Comstock Ave.,
Los Angeles, Calif. 90024
Filed Oct. 23, 1965, Ser. No. 503,721
9 Claims. (Cl. 74—41)

This invention relates to means for smoothing the power requirement placed upon an engine motor or other primary energy source by a mechanical power train moving a periodically pulsating load. The preferred form of the invention illustrated is applied to lift pumps, particularly that type used in petroleum wells. It is however readily apparent that similar mechanical movements with pulsating power requirements are found in other environment, particularly stamping presses. While the preferred form of the invention is illustrated here it is intended that the coverage of this invention be limited only by the appended claims and their proper range of equivalents.

The major problem encountered in mechanical systems of the type contemplated here lies in the fact that power may be delivered from a motor or engine most efficiently, both in terms of energy conversion and in terms of the size of engine required to deliver a given average power output, when the load placed upon the engine is relatively constant. Some power sources, such as synchronous electric motors, are inherently incapable of running at varying speeds, and thus might be called upon to deliver prodigious instantaneous power output into a pulsating load.

The problem of smoothing power output of a motor in such circumstances is an old one. It has frequently been met by incorporating a flywheel into the mechanism, as is well known, such a wheel stores rotational kinetic energy by accelerating and delivers energy to a load by decelerating. If the amount of energy so stored is large in proportion to the amount demanded by the load during any cycle of operation, the amount of rotational speed change in the power train can be quite small. However, the energy stored in such a rotating body is proportional to its moment of inertia and the square of its angular velocity. Mechanism such as oil pumps requiring a slow rate of pulsation, several seconds per cycle, tend to operate with too low an angular velocity in the power train to enable the storage of energy in the flywheel mode to significantly smooth the power requirement.

Since such devices require energy be supplied only during half of the duty cycle, and in fact provide a return energy supply, of smaller magnitude, during the other half of the cycle, they are customarily provided with a storage mechanism transferring power from an engine into gravitational potential energy of a ponderous counterbalance. Let the weight to be lifted by a pump jack be designated as $A+B$ and let this weight be exerted through a lever arm of maximum length $L$, where $A$ may represent the dead weight of the pump and sucker rods and $B$ the weight of the oil column lifted. Operation is most efficiently achieved if a counterpoise of such weight and lever arm as to exert a maximum moment of $L(A+\frac{1}{2}B)$ is supplied to assist the lifting moment. In this case the maximum torque which must be exerted by the engine and power train combination is $\frac{1}{2}LB$. Naturally this minimum can be achieved only if the counterpoise assumes the correct value, and numerous devices have been suggested by the prior art to secure this balance. Their use is of course desirable for its own sake, but their function is wholly independent of that performed by the device taught here.

Even with the use of a properly balanced counterpoise, there still exists the problem that the value $\frac{1}{2}LB$ represents the maximum value of the moment required to be generated and that as a function of time the instantaneous value of the moment required equals the modulus of $\frac{1}{2}LB \sin Wt$. In idealized constant speed operation, the power delivered by the motor on a time average basis is $2/\pi$ times the maximum rate of power delivery. A motor thus needs to be proportioned to supply over half again as much power at its maximum demand as it would require with constant power output to deliver the same average power. In practice, the flywheel effect, and its co-committant variation in the speed of operation of the motor, may provide a slight deviation from this condition at high operational speeds, though the effect is usually negligible.

I have found that the power requirement and operational speed characteristic of such devices may be very substantially smoothed by the incorporation in the power train of an additional counterpoise element rotating at twice the angular speed of the previously mentioned main counterpoise. The additional element also stores energy as gravitational potential energy but is so phased with respect to the motion of the main counterpoise that it absorbs energy from the train during the portion of the cycle in which the main counterpoise and load are not drawing energy from the motor and delivers energy to the train during that portion of the cycle during which the load and counterpoise combination is drawing energy at its greatest rate.

In what follows the energy requirement of the pump and counterpoise system is assumed to be substantially sinusoidal. Deviations from this condition due to friction, change in the weight of pumped oil and back pressure are generally negligible in terms of the overall power requirement cycle. If accurate counterbalancing is not accomplished by the main counterpoise, the loops of power requirement will not be of equal magnitude but the device described here will still tend to exhibit a leveling effect.

It is an object of this invention to provide a means for smoothing the power requirement placed upon the power source by a periodically pulsating load. It is a particular object to accomplish this when the load is supplied by a traveling beam oil pump.

It is an object to smooth the power requirement of a pulsating load and counterpoise moving in a particular cyclical period by adding to the power train an element which periodically absorbs and delivers energy to the train with half that temporal period.

In the drawings:

FIGURE 1 exhibits walking beam oil pump provided with a device of this invention.

FIGURE 2 exhibits a fragmentary section of the FIGURE 1 device along the lines 2—2 of FIGURE 1.

FIGURE 3 exhibits a fragmentary section of the subject device along the lines 3—3 in FIGURE 2.

FIGURE 4 provides a graph of the torque requirement verses time of the load-counterpoise combination and the supplemental smoothing counterpoise of FIGURE 1.

FIGURE 5 is a graph of the torque verses time requirement of the overall combination exhibited in FIGURE 1.

To now more completely describe the device of FIGURE 1. At 1 is shown an oil pump consisting of a Samson post 2 supporting a walking beam 3 through a trunnion 4, the walking beam supplies a pulsating mechanical traction to a polish rod-sucker rod string 5 descending into a well 6 for removal of oil therefrom. The string of rods 5 may be attached to the beam 3 through a conventional mulehead 7, journaled to beam 3. At the opposite end is a pitman 8 which is itself journaled to a crankarm 11 by a trunnion 12.

As shown in FIGURE 2 and FIGURE 3, crankarm 11 is in turn mounted to a crankshaft 13 mounted in a bearing 14 and carried by a support structure 15, here exhibited in the form of a housing. Crankarm 11 further carries a counterpoise 16 whose center of gravity is disposed co-radially with respect to crankshaft 13 with trunnion 12. Within housing 15 there may be disposed a conventional gear train, not shown, for transferring power from a motor or engine 17 in a perfectly conventional fashion.

Motor 17 may be an internal combustion engine or an electric motor. Such a motor may even be one adapted solely to constant speed operation, in which case starting may be effected by some auxiliary source not shown or through a fluid drive. This much of the mechanism is of course purely conventional.

The improvement described here comprises a smoothing counterpoise 21 carried a lever arm 22.

The improvement described here comprises a smoothing counterpoise 21 carried on a lever arm 22 which in turn is rigidly secured to an axle 23. Axle 23 is journaled to a support member 24 rigidly fixed to housing 15. Axle 23 is driven by a pinion 25 mounted thereto which in turn is driven by an internal gear 26 fixed to crankshaft 13 through crank 11. The gear ratio of gear 26 and pinion 25 is such that the angular velocity of axle 23 is twice the angular velocity of crankshaft 13.

In the preferred form shown, axle 23 and crankshaft 13 are both disposed horizontally and they are in such phased position that counterpoise 21 is rising when counterpoise 16 is moving substantially horizontally at the top and bottom portions of its path of travel. Thence it follows that counterpoise 21 is descending when counterpoise 16 is traveling vertically in either the ascending or descending portions of its path.

To describe the operation of the device, the conventional portion of the apparatus described above transmits power from the motor 17 through the gear train enclosed in housing 15 to the crankshaft 13 driving crankarm 11 and counterpoise 16 through a rotary course. Pitman 8 journaled to crank 11 forces walking beam 3 to oscillate about trunnion 4 on Samson post 2. Rod string 5 and the oil carried by a pump, not shown, attached thereto in well 6 supplies a resistive force to mulehead 7 carried on beam 3 to oppose this motion as mentioned above. The reactive moment due to the rod string and half of the oil lifted is counterbalanced by counterpoise 16 carried by crank 11 in such position that counterpoise 16 is lowering while the rod string and oil is raising and vice versa. In FIGURE 4 the graph verses time of the moment exerted upon the power source by this combination is shown at 31. A single rotary cycle of crank 11 imposes two loops 32 of moment upon the motor 17 and, between these loops, nodes 33 during which the rod string 5 is substantially stationary and the counterpoise 16 is moving horizontally.

To even the power requirement, smoothing counterpoise 21 traveling at twice the angular speed of crank 11 delivers an undulatory moment 34 to the power train and thus the motor 17. The graph of this moment shows maxima of power requirement 35 simultaneously with the nodes 33 of power requirement mentioned above, and maxima of power delivery 36 corresponding to loops of power requirement 32. Counterpoise 21 may be of any weight and lever arm such that its moment does not exceed $(\sqrt{2}+1)/4\sqrt{2}$ times the maximum moment $LB/2$ required by the unimproved system, and some improvement in performance will result. Above this value the maximum power requirement will be increased.

As the moment of the smoothing counterpoise is increased from zero to a value of $LB/16$ the maximum instantaneous power demand decreases from its original value M to .75M and the minimum power requirement increases from zero to ¼M, where M is the maximum instantaneous power demand of the unimproved apparatus. As the range of smoothing counterpoise moments increases from $LB/16$ to $LB/8$ the change in maximum power requirement is comparatively slight being ¾M at each end of the range. When the counterpoise as moment value of $LB/8\sqrt{2}$ a minimum value of .707M is obtained. At a moment value of $LB/8$ there is a minimax in which a minimum power requirement during the cycle achieves its maximum value of ½M.

Since the average power requirement throughout cycle is .637M it is apparent that the conventional machinery requires a motor to have an excess capacity of approximately 57% to provide constant speed operation, while with best practice, the improved device can make do with a motor having approximately 11% excess capacity and still operate with the greater power efficiency which results from a more uniform power drain. The significance of this smoothing operation may better be appreciated when referred to the operation as a large field of pumps or the like each operating at its own individual cycle frequency. The overall fluctuation in the demand on an electric distribution system to such a field is greatly reduced when there does not arise the opportunity for a large number of pumps to be simultaneously impressing their maximum demand, which may be considerably in excess of the average power requirement.

As described the smoothing counterpoise has its moment arm in phase quadrature with that of the balance counterpoise when the latter is moving horizontally. This situation is manifestly the optimum. However, appreciable advantages may accrue to operation of the system of the type describe even if quadrature at this phase point is only approximately established. Decrease in value to be derived from this system occurs slowly and then with increasing swiftness with deviation from such phase quadrature.

While the preferred form of the invention described contemplates an oil pump as the pulsating load and a ponderous balance counterpoise cyclically storing energy in the form of gravitational potential energy and a smoothing counterpoise doing the same, it is apparent that the teaching of this invention may be applied to a wide range of equivalents. Other pulsating loads may be supplied. Other means for storing energy sinusoidally with time or position displacement may be substituted. Among these may be mentioned cam actuated springs with linear or at least substantially linear force displacement characteristics.

Advantages according to the teachings herein will accrue even though the required mechanical energy storage elements may be air springs or the like. In these, the following exerted by the energy storage element is not constant with displacement of the energy transfer means. Precise sinusoidal energy requirement characteristics will, of course, not be placed upon the power source in this case, but a substantial smoothing may be obtained nonetheless. This is particularly true if the moment supplied by the smoothing counterpoise is so proportioned to the moment required by the load that the maximum moment exerted on the power train by these two elements combined never exceeds the maximum moment which would otherwise be exerted by the load alone.

I claim:

1. In a power delivery apparatus adapted to deliver to a periodically pulsating load mechanical energy from a constantly operating power source providing power at an average rate, said apparatus comprising a first reactive mechanical energy storage means, a first energy transfer means adapted to transfer mechanical energy into and out of said first storage element, a power train adapted to be coupled to said power source to derive mechanical energy therefrom, and to be coupled to said pulsating load to deliver mechanical energy thereto, said power train being coupled through said first transfer means to said first storage means to exchange mechanical energy therewith so as to deliver energy to said first storage means from said train while said pulsating load is in a first mode drawing power at less than said average rate from said train and to deliver energy from said first storage means to said power train during the time when said load is in a second mode drawing power at greater than said average rate, said power train being adapted to derive less than said average power from said power source during periodic time intervals between said two modes, the combination with said power train, said first storage means and said first storage element of a second reactive mechanical energy storage means, and a second energy transfer means operably connecting said second energy storage means and said power train and adapted to transfer energy therebetween, said second energy transfer means comprising phasing means timing the delivery of energy from said second storage means to said power train to occur during the periods of transfer of power from said power train to either said load or said first storage means, said phasing means further timing the delivery of power from said power train to said second storage means through said second transfer means to coincide with said periodic time intervals, said second storage means being adapted to store a positive amount of energy available to said power train not exceeding $(\sqrt{2}+1)8\sqrt{2}$ times the average energy consumed by said load during one cycle of operation.

2. The combination recited in claim 1 wherein said second energy transfer means comprises an axle, means journaling said axle for rotation about a second horizontal axis, a gear train providing said phasing means, said gear train operably connected to said axle and said power train and constraining said axle to make precisely two revolutions for each period of said pulsating load, said second energy storage means comprising a second ponderous element whose center of gravity is eccentric with respect to said second axis.

3. A combination as set forth in claim 2 wherein said power train comprises a crankshaft defining a first axis of rotation, said first storage element comprising a first ponderous means, said first energy transfer means fixing said first ponderous means to said crankshaft for rotation about said first axis with the center of gravity of said first ponderous means eccentric thereto, said gear train constraining said axle for rotation at twice the angular velocity of rotation of said crankshaft, said phasing means maintaining said second ponderous means in phase quadrature with said first ponderous means when said first ponderous means is in an extreme position with respect to gravitation potential.

4. Combination recited in claim 1 wherein said second storage means is adapted to store an amount of energy available to said power train between ⅛ and ¼ the average energy consumed by said load during one cycle of operation.

5. In a well pump assembly adapted to derive power from a constantly operating power source, and further adapted to support a string of pump rods and to oscillate said rods in a vertical direction to draw up liquid from a well, said assembly comprising in combination a supporting element, a beam, journal means connecting said support and said beam to permit rotation of said beam with respect to said support in a vertical plane, means adapted to connect said pump rod to said beam remotely of said journal means, the maximum instantaneous moment exerted in operation on said beam about said support by said liquid being $M$, a first shaft, means supporting and journaling said first shaft for rotation in a generally horizontal axis, means connected to said shaft and to said beam and adapted to derive power from said constantly operating power source, said last mentioned means constraining said first shaft and said beam to simultaneously pass in the same phase correspondence through repeated cycles of rotation and oscillation respectively, a first balance weight, means fixing said first balance weight to said first shaft eccentrically of said first axis thereof for rotation in a vertical plane, said weight so fixed on said first shaft as to move in phase opposition to said pump rod with respect to gravitational potential, the overall combination with said aforementioned combination of the improvement comprising a second shaft, means for journaling said second shaft for rotation in a horizontal plane, a second weight, means affixing said second weight to said second shaft with the center of gravity of said second weight eccentric thereto, means connecting said second shaft to said first mentioned combination and constraining said second shaft to rotate at twice the angular frequency of said first shaft in such phase relationship thereto that said second weight is in ascending phase quadrature with said first weight when said first weight is at an extremum with respect to gravitational potential, the maximum instantaneous moment exerted in operation by said second weight on said beam about said support by said constraining means collectively being positive and less than $(\sqrt{2}+1)M/8\sqrt{2}$.

6. The overall combination as set forth in claim 5 wherein said maximum instantaneous moment of said second weight in operation is greater than $M/8$ and less than $M/4$.

7. The overall combination as set forth in claim 5 wherein said maximum instantaneous moment of said second weight in operation is $M/8\sqrt{2}$.

8. For use with a power delivery apparatus adapted to deliver to a periodically pulsating load mechanical energy from a constantly operating power source providing power at an average rate, said apparatus comprising a first reactive mechanical energy storage means, a first energy transfer means adapted to transfer mechanical energy into and out of said first storage element, a power train adapted to be coupled to said power source to derive mechanical energy therefrom, and to be coupled to said pulsating load to deliver mechanical energy thereto, said power train being coupled through said first transfer means to said first storage means to exchange mechanical energy therewith so as to deliver energy to said first storage means from said power train while said pulsating load is in a first mode drawing power at less than said average rate from said train and to deliver energy from said first storage means to said power train during the time when said load is in a second mode drawing power at greater than said average rate, said power train being adapted to derive less than said average power from said power source during periodic time intervals between said two modes, a mechanical reaction smoother comprising a second reactive mechanical energy storage means, a second energy transfer means operably connected to said second energy storage means and adapted to be operably connected to said power train for transfer of energy therebetween said second energy transfer means comprising phasing means for timing the delivery of energy from said second storage means to said power train to occur during periods of transfer of power from said power train to either said load or said first storage means, said phasing means further adapted to time the delivery of power from said power train to said second storage means through said second transfer means to coincide with said periodic time intervals, said second storage means being adapted to store a positive amount of energy available to said power train not exceeding $(\sqrt{2}+1)/8\sqrt{2}$ times the average energy consumed by said load during one cycle of operation.

9. A mechanical reaction smoother as set forth in claim 8 wherein said second storage means is adapted to store an amount of energy available to said power train between ¼ and ⅛ the average energy consumed by said load during one cycle of operation.

References Cited

UNITED STATES PATENTS

| | | | |
|---|---|---|---|
| 1,948,288 | 2/1934 | Corey | 74—590 |
| 2,153,094 | 4/1939 | Maier | 74—41 |
| 3,277,730 | 10/1966 | Chastain | 74—41 |

FRED C. MATTERN, Jr., *Primary Examiner.*

W. S. RATLIFF, *Assistant Examiner.*